Nov. 15, 1932.  A. G. HEGGEM  1,888,000
VALVE
Filed March 31, 1930   4 Sheets-Sheet 1

Inventor
Alfred G. Heggem
By
Ritter & Ritter
his Attorneys

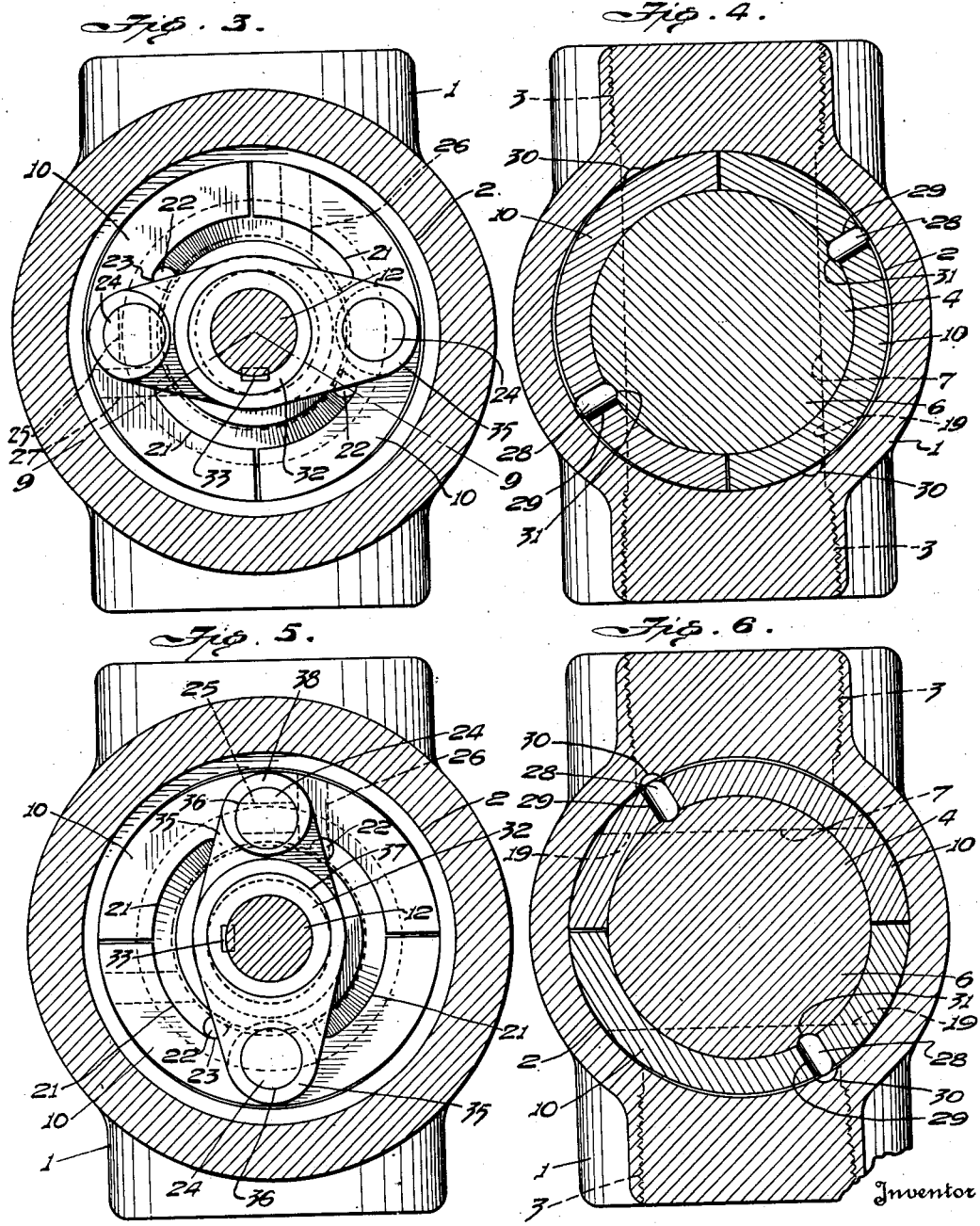

Nov. 15, 1932.  A. G. HEGGEM  1,888,000
VALVE
Filed March 31, 1930  4 Sheets-Sheet 3
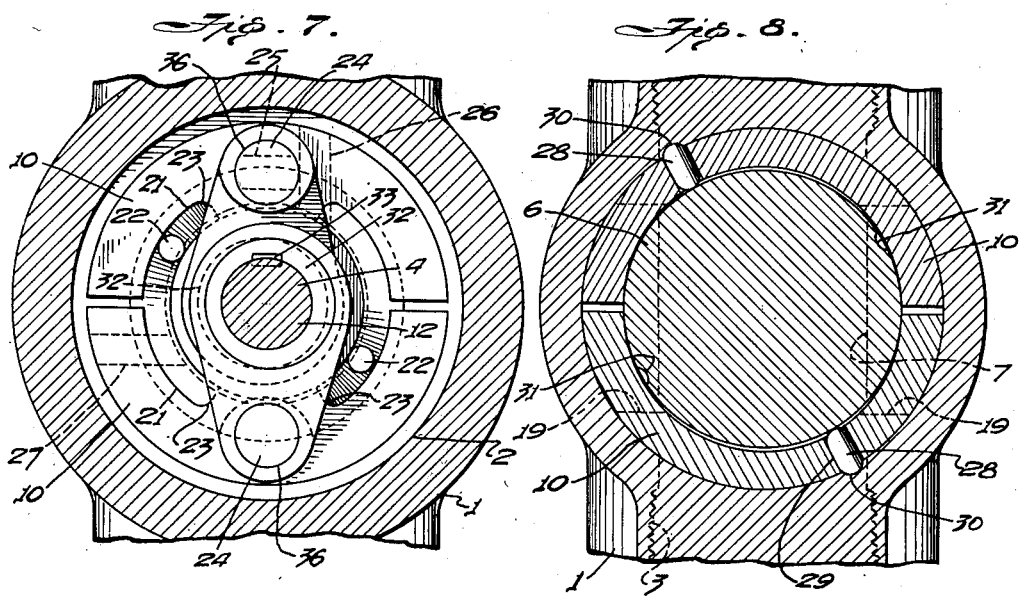
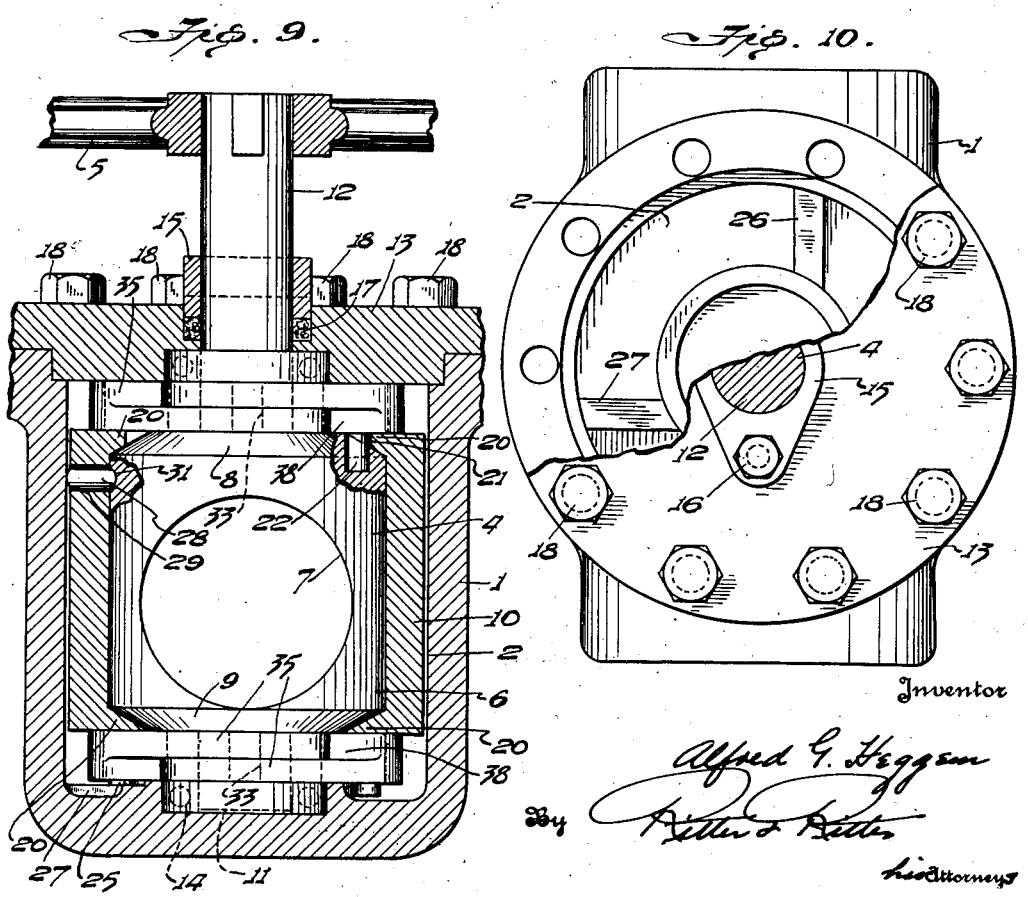
Inventor
Alfred G. Heggem
By Ritter & Ritter
his Attorneys Nov. 15, 1932.  A. G. HEGGEM  1,888,000
VALVE
Filed March 31, 1930    4 Sheets-Sheet 4
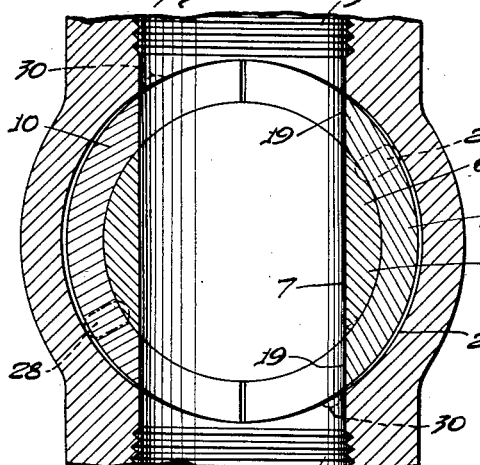
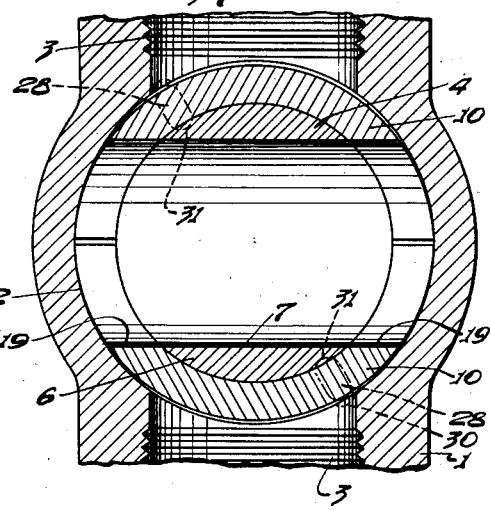
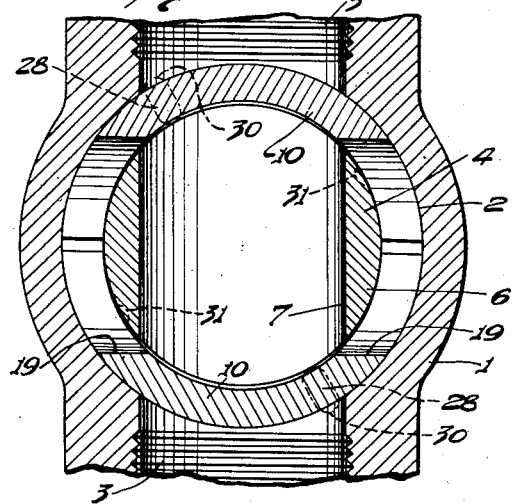
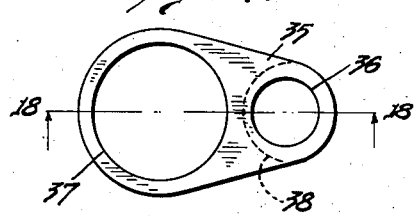
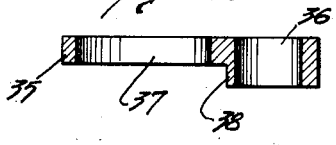
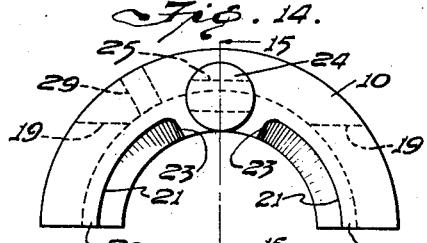
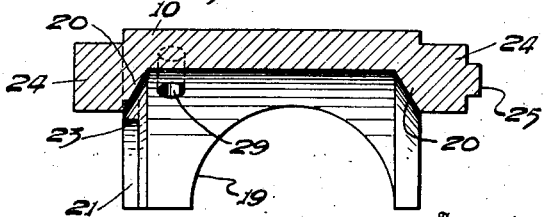
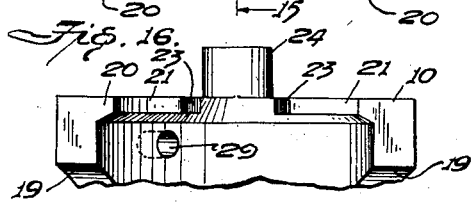
Inventor
Alfred G. Heggem
By Ritter & Ritter
his Attorneys Patented Nov. 15, 1932

1,888,000

UNITED STATES PATENT OFFICE

ALFRED G. HEGGEM, OF TULSA, OKLAHOMA

VALVE

Application filed March 31, 1930. Serial No. 440,431.

My invention relates to valves and is particularly designed to afford a construction well adapted for valves of large size capable of withstanding high pressures such as are encountered in oil and gas wells.

The principal objects of the invention are to provide a valve which may be opened or closed quickly, which will seat positively, which is not subject to excessive wear nor easily distortable and which is constructed so as to avoid the formation of cavities apt to result in rendering the valve inoperative by permitting lodgement therein of solid matter contained in the passing fluid.

Three general types of valves have long been in use, namely, the tapered plug valve, the sliding gate valve and the globe or single seat valve. While the tapered plug valve is efficient in small sizes and for light pressures, it is ineffective and practically inapplicable where the volume of the passing fluid is large and its pressure is high. Many attempts have be made to modify the tapered plug form of valve to adapt it for use in large sizes where the fluid pressure is high, as, for example, by forcing grease between the valve plug and the valve body so as to lubricate the parts and reduce friction, or by providing means for axially moving the plug so as to increase the clearance between it and the valve body and thus reduce or eliminate friction between those parts; but such modifications of this form of valve have not been practically satisfactory. While sliding gate valves are more advantageous where the volume of fluid to be controlled is large, the sliding contact of the valve on the valve seat causes destructive wear due to friction when the fluid pressure is high. Moreover, the flat surface of these valves is difficult to machine true and the valves are very prone to warp or distort under pressure and, in addition, they can be moved under high pressures only with extreme difficulty. Some of these disadvantages of the gate type valve have been more or less overcome by constructing the gate as two flat members between which a wedge is interposed, the movement of the wedge serving to press the valve members against their seats without frictional sliding movement against the seats. This improved form of gate valve has the advantage of direct seating of the valve which is characteristic of the globe or flat seat valve where the contact between the valve and its seat is effected without friction; but globe valves and gate valves are necessarily slow in action, and the plug valve, in its present forms, while quick in action is not suited for the efficient control of large volumes of fluid at high pressures. My invention affords a construction having the advantages of the quick operation of the plug valve and the positive seating of the globe valve and, moreover, enables the parts to be made of rugged and simple form.

A primary feature of the invention consists in providing the valve with a body having a valve receiving chamber communicating with an inlet opening and an outlet opening for permitting the passage of fluid, and in combining with said body rotatable means extending into said chamber for controlling the flow of fluid, the said means including a stem member or core having a passage for permitting the fluid to flow therethrough and also including a plurality of valve plates embracing the stem member or core and interposed between it and the valve body, the valve plates being rotatable with the core so as to enable them to overlap or uncover the said openings in the valve body, and the stem member or core being also capable of rotating relatively to the valve plates, and means actuated by the stem member or core being provided for causing the valve plates to be pressed into sealing contact with the valve body or to be released therefrom during the rotation of the core member with respect to the valve plates.

A further feature of the invention consists in forming the valve with a chambered body within which is rotatably mounted a stem member or core associated with valve plates that are movable thereby, the core member and the valve plates being relatively rotatable and the plates being adapted to prevent or permit the flow of fluid through the valve, depending upon the position to which they are moved by the core member, and means being provided for automatically locking the valve plates to the core member during a portion of the rotation of the latter and for locking said plates to the valve body during another portion of the rotation of the core member.

A still further feature of the invention consists in coupling the valve plates to the stem member or core through the instrumentality of links actuated by eccentrics carried by the core member, whereby rotation of the core with respect to the valve plates in one direction causes the plates to be pressed into sealing contact with the valve body, while rotation of the core in the opposite direction with respect to the valve plates withdraws the latter from sealing engagement with the valve body.

There are other features of the invention pertaining to combinations and relations of parts and advantageous forms of elements, as will hereinafter appear.

In the drawings illustrating the invention, the scope whereof is pointed out in the claims,—

Figure 3 is a sectional view on the line 3—3, Figure 1.

Figure 4 is a sectional view on the line 4—4, Figure 1.

Figure 5 is a view corresponding to Figure 3 but showing the positions assumed by the parts when the valve plates overlap the inlet and outlet openings of the valve body without being in sealing contact with the body.

Figure 6 is a view corresponding to Figure 4 but showing the parts in the positions illustrated in Figure 5.

Figure 7 is a transverse sectional view corresponding to Figure 5 but illustrating the positions assumed by the parts when the valve plates are in sealing contact with the valve body.

Figure 8 is a transverse sectional view corresponding to Figure 6 but showing the positions of the parts when the valve plates are in sealing contact with the valve body.

Figure 9 is a view partly in elevation and partly in section on the line 9—9, Figure 3.

Figure 10 is a detail plan view showing the valve body, portions of its cover plate and packing gland for the valve stem, the latter being shown in section.

Figure 11 is a transverse central sectional view showing the valve in the open position, the relative positions of the detents, as shown in Figure 4, being indicated in dot and dash lines.

Figure 12 is a view corresponding to Figure 11 but showing the positions assumed by the parts when the valve plates are released from their seats on the valve body as shown in Figures 5 and 6.

Figure 13 is a view corresponding to Figures 11 and 12 but showing the valve plates in intimate contact with the valve body as illustrated in Figures 7 and 8.

Figure 14 is a detail plan view of one of the valve plates.

Figure 15 is a detail sectional view on the line 15—15, Figure 14.

Figure 16 is a detail elevational view of a portion of one of the valve plates.

Figure 17 is a detail plan view of one of the links by which the valve plates are forced into sealing contact with the valve body.

Figure 18 is a sectional view on the line 18—18, Figure 17.

Figure 1:
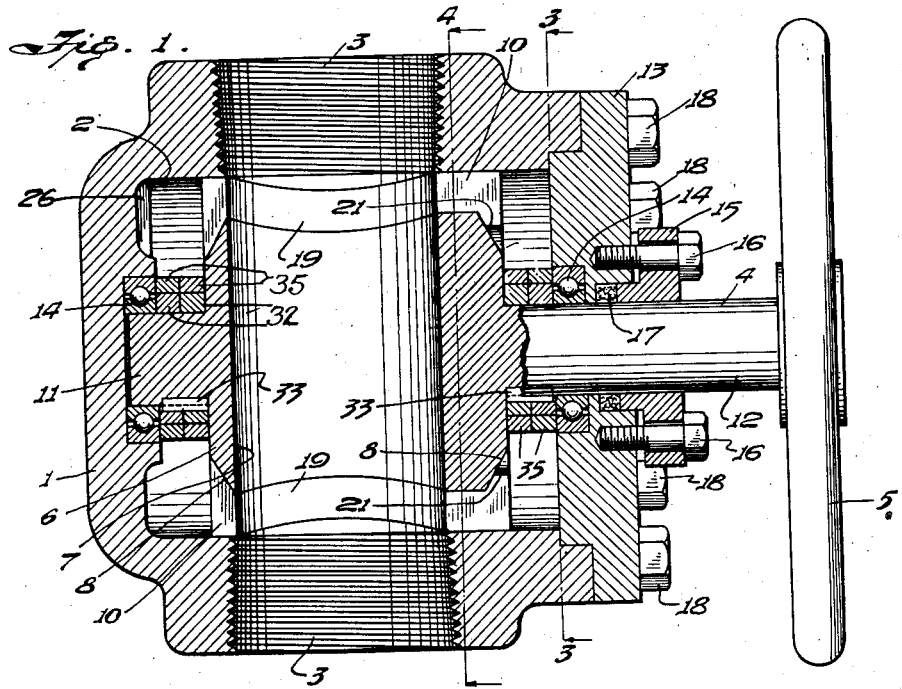
Figure 1 is a vertical central section of the valve, the operating hand wheel and a portion of the stem member being in elevation and the parts being in the positions they occupy when the valve is fully open.

The body 1 of the valve is formed with a circularly curved chamber 2 communicating with openings or passages 3 providing for the admission and escape of the fluid to be controlled by the valve. As shown in the drawings, these inlet and outlet passages 3 preferably are in alinement or have a common axis and the interior surfaces of their walls are preferably threaded in order that the valve may be screwed on to the casing of a well, as the valve is particularly suitable for use in conjunction with a well drilling rig as the drilling bits and tools may be operated through it. It is to be understood, however, that while the valve is particularly well adapted for such purpose it is capable of other applications and the precise details of construction whereby it is adapted to be connected to the well casing or other piping are not essential.

The chamber 2 or bore of the valve body is preferably of cylindrical form throughout and of uniform diameter. Extending into this chamber is a stem member or core 4 to the outer end of which an operating handwheel 5 is rigidly secured. The intermediate portion 6 of the stem member which intervenes between the inlet and outlet openings 3 of the valve body is enlarged and through it in a direction normal to the axis of the bore 2 of the body extends a passage 7 which may be and preferably is of complete cylindrical form and of a diameter corresponding to that of the inlet and outlet openings 3 of the valve body.

The intermediate portion 6 of the core or stem member is circularly curved or cylindrical and its opposite ends may advantageously be coned or bevelled, as indicated at 8 and 9 respectively, to provide clearance while permitting bevelled or braced attachment of the trunnions 24 to the valve plates 10, thereby securing maximum strength with minimum weight of material.

Figure 2:
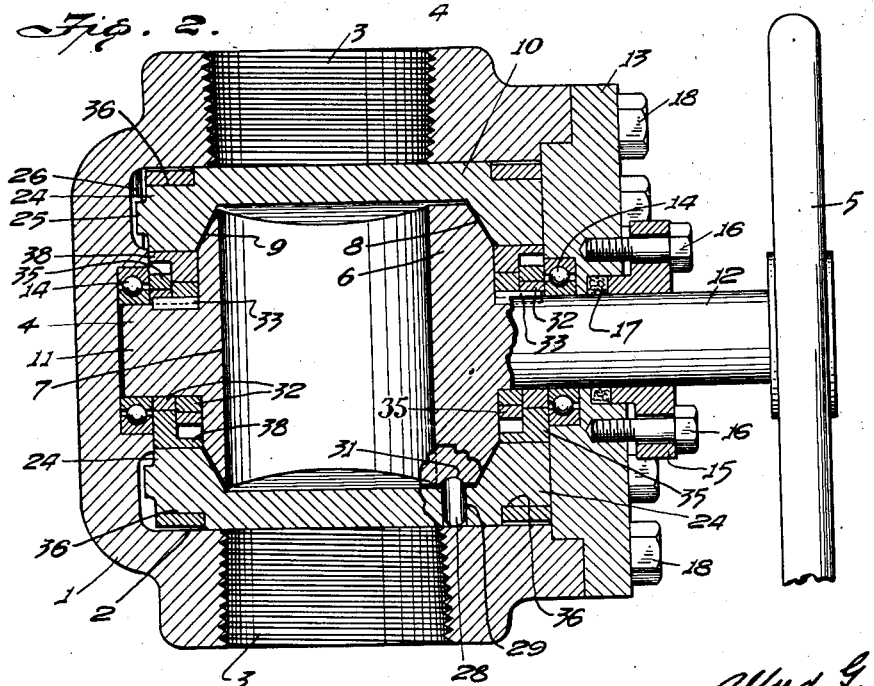
Figure 2 is a view corresponding to Figure 1, but showing the positions assumed by the parts when the valve is fully closed.

As a convenient means for rotatably mounting the core or stem member 4 in the valve body, said core member may be provided at one end with a short projection or shaft 11 and at the opposite end is fashioned with another stem or shaft 12 which projects through the cover plate 13 of the valve body 1 and to which the handwheel 5 is secured. As shown in the drawings the shafts or projections 11 and 12 of the stem member or core 4 may, if desired, have any suitable type of antifriction bearings, such as ball bearing mountings 14 (see Figures 1 and 2) for reducing friction between the member 4 and the valve body and its cover plate. The opening in the cover plate 13 through which the shaft portion 12 of the rotatable core member 4 extends may be packed in any suitable way, as by means of a gland 15 which is adjustably secured to the cover plate by bolts 16, packing 17 being interposed between the cover plate and the inner end of the gland in the usual manner. The cover plate, which may be stepped upon its inner surface to conform to corresponding stepping of the abutting portion of the valve body, may advantageously be secured to the body 1 by means of bolts 18.

Embracing the stem member or core 4 within the chamber 2 of the valve body 1 are oppositely disposed valve plates 10 preferably in the form of substantially semi-circular cylindrical segments, each of which is cut away at its ends, as indicated at 19, to permit fluid to pass through the valve when the valve plates are in proper position. These openings or recesses 19 in the valve plates are preferably circularly curved and of the same diameter as the openings 3 in the valve body and the passage 7 through the core member 4, so that when the valve is open a continuous unobstructed cylindrical passage of substantially uniform diameter throughout is provided for the flow of fluid or for the passage of tools.

Each valve plate is exteriorly curved to conform to the curvature of the chamber 2 of the valve body and is interiorly curved to correspond to the exterior curved surface of the intermediate portion 6 of the rotatable stem member or core 4. At its opposite ends each valve plate is preferably provided with an inwardly extending flange 20 which overlaps the neighboring end of the valve stem member 4, the under surfaces of these flanges being preferably bevelled to gain strength of construction in limited axial length. Portions of the flange at one end of each of the valve plates 10 are cut away, as indicated at 21, to provide clearance for stop pins 22 carried by the stem member 4 and afford abutments 23 on the valve plates for cooperating with said pins. The stop pins, which are preferably spaced diametrically opposite each other may be conveniently formed as cylindrical members driven tightly into suitable openings in the core member 4. The valve plates 10 are formed at their opposite ends with projecting trunnions 24, one of which is provided with a stop lug 25 for cooperating with stop lugs, 26 and 27 respectively, formed on the interior of the valve body 1 at the bottom of the chamber 2 thereof. As will be seen upon reference to Figures 3 and 7, the stop lug 25 upon the valve plate engages the stop 27 upon the valve body when the valve is open and engages the stop 26 of the body member 1 when the valve plates 10 seal the inlet and outlet openings 3 of the valve body. For the sake of uniformity of manufacture and in order to avoid the possibility of improperly assembling the valve plates 10 in relation to the stops 26 and 27 of the valve body, each valve plate is preferably provided with the stop lug 25, but it will be understood, of course, that only one of these lugs is necessarily operative in the valve structure. Each valve plate 10 preferably carries a detent 28 which serves to releasably and alternately lock the valve plate to the revoluble core member 4 and to the stationary valve body 1, so that the valve plates may move with the core during a portion of the rotation of the latter and may remain stationary during another part of the rotation of the core. These locks or detents are preferably in the form of round pins 28 slidably mounted in suitable openings 29 of the valve plates and extending radially therethrough, the ends of the detents being curved. To receive the respectively adjacent ends of these locking pins 28 the valve body 1 is formed on its interior with recesses or notches 30 and the curved exterior surface of the stem member or core 4 is similarly provided with notches 31. As will be readily understood upon reference to Figures 2, 4, 6, 8 and 9 of the drawings, the notches 30 in the valve body 1 are positioned so that the outer ends of the respective detents 28 stand opposite them when the valve plates 10 overlie the inlet and outlet openings 3 of the valve body in position for closing said openings; and the notches 31 in the stem member or core 4 are arranged so that (see Figure 6) they are opposite the inner ends of the detents 28 when the valve plates 10 are in closed position without being pressed into tight seating contact with the valve body 1. This relation of the notches 30 and 31 to the locking pins 28 results in maintaining the valve plates 10 in locked relation to the stem member 4 when the valve is open (see Figures 3, 4 and 11) and causes said plates to rotate positively with the stem member 4 until, during the clockwise rotation of the latter for closing the valve, the plates 10 have been turned to fully overlap the inlet and outlet openings 3 of the valve body preliminary to being forced into tight sealing contact with the body. At this point in the closing rotation of the valve core member 4 (see Figure 6) the sliding detents 28 carried by the valve plates 10 are in proper position for entering the notches 30 of the valve body to free the valve plates from the stem member 4 and lock them to the valve body.

As a means for forcing the valve plates 10 into firm contact with their seats upon the valve body to seal the inlet and outlet openings 3 of the latter, the valve member or core 4 is preferably provided immediately above and below its enlarged intermediate portion 6 with a plurality of eccentrics 32, one pair of these eccentrics encircling the short projection or shaft 11 of the stem member and another pair encircling the stem portion 12 to which the hand-wheel 5 is attached. These eccentrics which are caused to rotate with the stem member or core 4 by being suitably secured thereto, as by means of keys 33, are disposed in such positions with respect to each other that they cause the valve plates 10 to be pressed into sealing contact with the valve body or to be released from such sealing contact at appropriate intervals during the rotation of the valve stem member.

The members for operatively connecting the valve plates 10 to the eccentrics 32 carried by the core member 4 may be conveniently formed as links 35 (see Figures 17 and 18) each having a circular opening 36 for receiving one of the trunnions 24 with which the valve plates are provided and each also being formed with a circular opening 37 for receiving one of the eccentrics 32. As each of the link members 35 encircles an individual eccentric 32 their inner ends are overlapped. To permit this overlapping while yet enabling a single form of link 35 to be employed, the outer end of each link is preferably fashioned on one side with a boss 38, thus increasing the thickness of the outer end of the link so as to permit it to have a bearing on the valve plate 10 with which it cooperates notwithstanding that its inner end may be in a different plane. To afford clearance for the respective eccentrics 32 the bosses 38 are preferably reduced in thickness on one side, as shown in Figure 5, thereby contributing to the compactness of the device while permitting the trunnions 24 to be made of increased strength.

The cooperating surfaces of revolution with which the valve plates, valve body, and valve stem member are provided are preferably cylindrical because they may be readily and accurately formed by simple manufacturing processes. The illustration of the preferred form of these surfaces of revolution, however, is not to be construed as limiting the invention to the particular forms shown in the drawings.

In operation, when the valve is open, as shown in Figures 1, 3, 4, 9 and 11, a clockwise motion of the hand-wheel 5 causes the stem member or core 4 to rotate, carrying the valve plates 10 therewith, such rotation of the valve plates with the core being due to the fact that these parts are then positively locked together by the sliding detents 29, as shown in Figure 4. By a quarter turn of the core member in clockwise direction, the valve plates 10 are brought into overlapped relation with the inlet and outlet openings 3 of the valve body, as shown in Figures 6 and 12, and the detent pins 28 are carried into alinement with the respective notches 30 in the valve body 1. At the end of this quarter turn of the valve plates 10 the stop lug 25 carried by one of the valve plates comes into contact with the stop or abutment 26 formed on the interior of the valve body at the bottom of the chamber 2 thereof, thus arresting the turning movement of the valve plates 10 and insuring their assumption of proper positions for closing the inlet and outlet openings 3 of the valve body. Continued clockwise rotation of the stem member or core 4 after this turning movement of the valve plates 10 has been arrested, causes the sliding detents 28 to be released from their receiving notches 31 in the core and to be forced into the corresponding notches 30 of the valve body 1, thus locking the valve plates 10 to the valve body. After the sliding locking pins 28 have thus released the core member 4, a further clockwise rotation of the latter acts through the eccentrics 32 and the links 35 to force the valve plates 10 into firm sealing contact with the valve body as shown in Figures 2, 7, 8, and 13, thereby preventing passage of fluid through the valve. In opening the valve the handwheel 5 is turned counterclockwise to effect a corresponding rotation of the valve stem member or core 4. The initial portion of this rotation of the core is effected while the valve plates 10 remain locked to the valve body by the sliding detents 28. This relative turning of the core 4 with respect to the valve plates results in turning the eccentrics 32 so as to cause their cooperating links 35 to positively withdraw the valve plates from sealing contact with the valve body. When the valve plates 10 have thus been released from sealing contact with the valve body and clearance between said plates and the body has been established, each of the pins 22 carried by the valve stem or core member 4 comes into contact with one of the shoulders or abutments 23 of the valve plates. The parts are then in the positions shown in Figures 5, 6 and 12 except that the outer ends of the sliding detents 28 are in the notches 30 of the valve body. When the pins 22 carried by the core member 4 have engaged the shoulders 23, further counterclockwise rotation of the core causes the valve plates 10 to move therewith, thus withdrawing the sliding detents 28 from the notches 30 in the valve body and causing them to project into the notches 31 in the core. The valve plates are thus automatically unlocked from the valve body 1 and automatically locked to the stem member or core 4 so as to rotate with the latter. Further counterclockwise rotation of the valve stem member shifts the valve plates 10 from overlapping relation with the inlet and outlet openings 3 of the valve body. When the valve plates have rotated sufficiently far to completely uncover the openings 3 of the stop lug 25 on one of said plates comes into contact with the stop lug 27 within the chamber 2 of the valve body (see Figs. 3 and 9), thus arresting the opening rotation of the valve plates 10 as well as further opening rotation of the valve stem member 4. The valve is thus fully opened as shown in Figures 1, 3, 4, 9 and 11.

It will be noted that my invention provides features whereby the retraction of the valve plates from their seats upon the valve body may be effected positively; and it will also be appreciated that the retraction of the plates prevents their rubbing contact with the cylindrical bore of the valve body at any time, as the movement of the valve plates into sealing contact with the body is in a direction normal to the valve core and is effective after the rotation of the valve plates has been accomplished. Ability to positively retract the valve plates is of special advantage in the case of very high pressure valves because the pressure in the direction of flow while assisting one valve plate to leave its seat would operate to prevent the other valve plate from leaving its seat unless positive means to retract it were employed.

I claim:

1. A valve involving a valve body formed with a chamber and having an inlet opening and an outlet opening, said openings being in communication with said chamber, and means extending into said chamber and rotatable with respect to said body for controlling the flow of fluid through said openings, said means including a valve core having a passage permitting the flow of fluid therethrough, a plurality of valve plates engaging said core and respectively interposed immediately between said valve core and the valve body and adapted to close said openings, said valve plates, core and body being so formed that said plates and core may rotate with respect to said body and that said core may rotate relatively to said plates, and a plurality of link members movable with respect to said core and actuated upon a rotation of said core with respect to said valve plates for forcing said plates into sealing contact with the valve body to prevent passage of said fluid through said openings in the body.

2. A valve involving a valve body having an inlet opening and an outlet opening and provided with a chamber communicating with said openings, and means extending into said chamber and rotatable with respect to said body for controlling the flow of fluid through said openings, said means including a valve core having a passage permitting the flow of fluid therethrough, a plurality of valve plates respectively interposed immediately between said core and the valve body and adapted to close said openings in the body, and a plurality of link members movable with respect to said core and actuated upon rotation of the latter with respect to said plates to force said plates into sealing contact with said body, said body, core and valve plates being formed with surfaces of revolution permitting said valve plates to rotate with respect to said body and with resect to said core.

3. A valve involving a valve body formed with a chamber and having openings permitting fluid to flow into and out of said chamber, a valve core extending into said chamber and having a passage permitting the flow of fluid therethrough, means for rotating said core, a plurality of valve plates immediately interposed between said core and the valve body and adapted to close said openings in the body, a plurality of links respectively connecting said plates to the core, said body, core and valve plates having surfaces of revolution permitting said plates to rotate with respect to said core and with respect to said body, means for causing the valve plates to rotate with the core, means for preventing rotation of the valve plates during a further rotation of the core, and means for actuating said links while said plates are prevented from rotating.

4. A valve involving a valve body formed with a chamber and having openings permitting fluid to flow into and out of said chamber, a valve core extending into said chamber and having a passage permitting the flow of fluid therethrough, a plurality of valve plates respectively interposed immediately between said valve core and the valve body and adapted to close said openings in the body, said body, core and plates having surfaces of revolution permitting the plates to rotate with respect to the body and to the core, said surfaces of revolution of said plates being respectively opposed to those of said body and core, means for locking the valve plates to the core to permit said plates to rotate with respect to the valve body, said means being releasable to permit said core to rotate with respect to said plates, and means operating upon relative rotation of the core with respect to the plates for shifting said plates so as to press them into sealing contact with said valve body or to withdraw them from such sealing contact.

5. A valve involving a valve body having a chamber and openings permitting the flow of fluid to and from said chamber, and means extending into said chamber and rotatable with respect to said body for controlling the flow of fluid through said openings, said means including a valve core having a passage permitting the flow of fluid therethrough, a plurality of valve plates respectively interposed immediately between said core and the body and adapted to close said openings in the latter, said valve plates, core and body, being so formed that said plates may rotate with respect to said body and also with respect to said core, and means movably connected to said plates and core for positively shifting said plates radially both inwardly and outwardly with respect to the core upon rotation of the latter with respect to said plates.

6. A valve involving a valve body formed with a chamber having a surface of revolution and having openings for the flow of fluid into and out of said chamber, means extending into said chamber and rotatable with respect to said body for controlling the flow of fluid through said openings, said means including a plurality of valve plates having surfaces of revolution corresponding to that of said chamber and respectively adapted to close said openings, a valve core having a passage permitting the flow of fluid therethrough, said valve plates being immediately interposed between said core and said valve body, and said core being interposed between said valve plates, and means for positively shifting said plates toward said core to retract them from sealing contact with the valve body.

7. A valve involving a valve body formed with a chamber and having openings for the flow of fluid into and out of said chamber, rotatable means extending into said chamber for controlling the flow of fluid through said openings, said means including a plurality of valve plates and a valve core, said valve plates being interposed immediately between said core and body and being adapted to close said openings in the body, said valve plates, core and body being formed with surfaces of revolution permitting said plates to rotate alternately with respect to the body and to said core, means for rotating said core, means for causing the valve plates to rotate with said core during a portion of the valve closing rotation of the latter to thereby shift said valve plates into overlapping relation with said openings in the valve body, means for arresting the closing rotation of the valve plates during the valve closing rotation of said core, means for forcing said valve plates into sealing contact with the valve body during the final portion of the valve closing rotation of said core, means for arresting rotation of the valve plates with respect to the body during the initial valve opening rotation of said core, means operating during the initial valve opening rotation of said core for withdrawing said valve plates from sealing contact with the valve body, and means cooperating with the core and the valve plates for causing the plates to turn with the core during a portion of the valve opening movement of the latter to thereby shift the plates out of overlapping relation to said openings in the valve body.

8. A valve involving a valve body having an inlet opening and an outlet opening and provided with a chamber communicating with said openings, a valve stem member extending into said chamber, a plurality of valve plates interposed immediately between said stem member and the valve body and adapted to close said openings in the body, said stem member, body and valve plates having surfaces of revolution permitting said plates to rotate with respect to said stem member and with respect to said body, and means for alternately locking said valve plates to said stem member and to the valve body.

9. A valve involving a valve body having a chamber formed with a surface of revolution and having openings permitting fluid to flow into and out of said chamber, a valve core extending into said chamber and having a passage permitting the flow of fluid therethrough, and a plurality of valve plates respectively interposed immediately between said valve core and the valve body and adapted to close said openings in the body, said core and plates having contiguous surfaces of revolution permitting the plates to rotate with respect to the body and permitting the core to rotate with respect to said plates, said valve plates being formed with recesses at their opposite edges forming openings permitting fluid to pass through said openings in the valve body and said passage in the core when the valve is open.

10. A valve involving a valve body having a chamber formed with a surface of revolution and having openings permitting fluid to flow into and out of said chamber, a valve core extending into said chamber and having a passage permitting the flow of fluid therethrough, and a plurality of valve plates respectively interposed immediately between said valve core and the valve body and adapted to close said openings in the body, said core and plates having contiguous surfaces of revolution permitting rotation of the core with respect to the plates and the body and permitting relative rotation of the plates and the core, said valve plates being formed at their opposite edges with recesses which, in conjunction with said openings in the valve body and said passage in the core, constitute a straight passage through the valve when the valve plates are in open position.

11. A valve involving a valve body formed with a chamber and having openings permitting fluid to flow into and out of said chamber, a valve core extending into said chamber and having a passage permitting the flow of fluid therethrough, a plurality of valve plates respectively interposed immediately between said valve core and the valve body, said plates, core and body having surfaces of revolution permitting the plates to rotate with respect to the body and to the core, means for rotating said core, and means for causing said valve plates to seal said openings in the valve body while overlapping said passage through the core.

12. A valve involving a body having a chamber formed with a surface of revolution and having openings for permitting the flow of fluid into and out of said chamber, means extending into said chamber and rotatable with respect to said body for controlling the flow of fluid through said openings, said means including a plurality of valve plates and a member interposed between them having a passage for the flow of fluid, said valve plates being immediately interposed between said body and said member and being respectively adapted to close said openings of the valve body and having surfaces of revolution of substantially equal curvature to that of said chamber, and means for forcing said valve plates into sealing contact with said valve body, said last named means including rotatable eccentrics and means pivotally connected to said valve plates for cooperating with said eccentrics.

13. A valve involving a valve body formed with a chamber and having openings for the flow of fluid into and out of said chamber, a valve core extending into said chamber and having a passage permitting the flow of fluid therethrough, a plurality of valve plates interposed immediately between said core and the valve body and adapted to close said openings in the body, said plates, body and core having surfaces of revolution permitting said core and said plates to rotate with respect to the body and permitting the core to rotate with respect to the plates, said surfaces of revolution of the body and core respectively cooperating with said plates, a plurality of eccentrics carried by said core, and means pivotally connected to said plates for cooperating with said eccentrics.

14. A valve involving a valve body formed with a chamber and having openings permitting fluid to flow into and out of said chamber, a valve core extending into said chamber and having a passage permitting the flow of fluid therethrough, a plurality of valve plates interposed immediately between said core and the valve body and adapted to close said openings in the body, said plates, body and core having surfaces of revolution permitting the core and plates to rotate with respect to the body and permitting the core to rotate with respect to the plates, said surfaces of revolution of the body and core respectively cooperating with said plates, a plurality of eccentrics rigidly connected to said core, a plurality of links respectively cooperating with said eccentrics and pivotally connected to said links, and means for rotating said core with respect to said valve plates.

15. A valve involving a valve body formed with a chamber of circular cross section and having openings permitting fluid to flow into and out of said chamber, a valve core externally curved concentric with said chamber and having a passage permitting the flow of fluid therethrough, said passage being adapted to occupy a position in alinement with said openings, a plurality of valve plates interposed between said core and valve body and respectively adapted to close said openings in the body, each of said valve plates having concentrically curved surfaces for respectively cooperating with said core and the valve body and each being recessed at its opposite edges to form openings permitting fluid to flow through said passage of the core, means for rotating the core, means for releasably locking the valve plates to the core, and means actuated during rotation of said core with respect to the plates for forcing said plates into sealing contact with the valve body to close said openings in the latter.

16. A valve involving a valve body formed with a chamber of circular cross section and having openings permitting fluid to flow into and out of said chamber, a valve core having a curved exterior surface concentric with said chamber and having a passage permitting the flow of fluid therethrough, a plurality of valve plates interposed immediately between said core and the valve body and adapted to close said openings in the body, said plates being of arcuate form to permit them to rotate with respect to the body and the core, means for rotating the core, means for releasably connecting said valve plates to the core and the body alternately, and means for forcing said valve plates into contact with the body to seal said openings in the latter, said valve plates being formed with inwardly projecting flanges which overlap said core.

17. A valve involving a valve body formed with a chamber and having openings permitting fluid to flow into and out of said chamber, a valve core extending into said chamber and having a passage permitting the flow of fluid therethrough, a plurality of valve plates interposed between said core and the valve body and adapted to close said openings in the body, said core, body and valve plates having cooperating circularly curved surfaces permitting said core and plates to rotate with respect to said body and permitting said core to rotate with respect to said plates, means for rotating said core, a plurality of eccentrics carried by said core and rotatable therewith, a plurality of links respectively cooperating with said eccentrics, said valve plates being provided with trunnions for respectively cooperating with said links, and means for arresting rotation of the valve plates with respect to the body when said plates fully overlap said openings in the body.

18. A valve involving a valve body having a chamber formed with a circularly curved surface and having openings permitting fluid to flow into and out of said chamber, a valve core extending into said chamber and having a passage permitting the flow of fluid therethrough, a valve plate interposed immediately between said core and the valve body and adapted to prevent fluid from flowing through said body, said core having its exterior surface curved concentric with said chamber, said valve plate having concentric exterior and interior curved surfaces permitting it to rotate with respect to said core and with respect to the valve body, means movable with respect to said plate and core for causing said valve plate to rotate with said core, and means for rotating the core.

19. A valve involving a valve body having a circularly curved chamber and having openings permitting fluid to flow into and out of said chamber, a valve core having its exterior surface curved concentric with said chamber and provided with a passage extending therethrough transversely thereof, said passage being adapted to occupy a position in alinement with said openings of the valve body, a cover plate for said chamber of the valve body, a plurality of valve plates interposed between the core and the valve body, said valve plates having concentrically curved surfaces respectively adapted to cooperate with the curved surface of said chamber and the said curved surface of the core, said core having an enlarged intermediate portion and oppositely extending stem portions between which said enlarged portion intervenes, one of said stem portions extending through said cover plate, a plurality of eccentrics encircling each of said stem portions of the core and rigidly connected to said core, a plurality of links each having an opening for receiving one of said eccentrics, each of said valve plates being provided at its opposite ends with trunnions, each of said links being provided with an opening for receiving one of said trunnions, meas for rotating said core, and means for releasably connecting said valve plates to the core.

20. A valve involving a valve body having a circularly curved chamber and having openings permitting fluid to flow into and out of said chamber, a circularly curved valve core having a passage permitting the flow of fluid therethrough, a plurality of valve plates interposed between the core and the body and respectively adapted to close said openings in the body, said valve plates having their exterior surfaces circularly curved to conform to the curvature of said chamber and having their inner surfaces curved to conform to said core, means for rotating said core, means actuated upon a rotation of said core with respect to the valve plates for forcing said plates into sealing contact with said body and for retracting them from sealing contact with said body, and sliding detents carried by the valve plates for alternately locking the said plates to the valve core and to the valve body, said core and said body being respectively provided with recesses for receiving the adjacent ends of said detents.

21. A valve involving a valve body formed with a circularly curved chamber and having openings permitting fluid to flow into and out of said chamber, a valve core extending into said chamber and having a passage permitting the flow of fluid therethrough, the exterior surface of said core being curved concentric with the valve chamber, a plurality of valve plates of arcuate form interposed immediately between the valve body and said core and respectively adapted to close said openings in the body, said plates each having concentric curved surfaces respectively cooperating with said body and said core, said core being rotatable with respect to the body and said plates and the latter being rotatable with respect to the core and said body, means for rotating said core, stop means for limiting the extent of rotation of said valve plates with respect to the body, means for causing said valve plates to rotate with respect to said body, and means operating during a movement of the core with respect to the valve plates for forcing said plates into sealing contact with said body to close said openings, said last-named means also serving to positively withdraw said valve plates from sealing contact with said body.

22. A valve involving a valve body formed with a circularly curved chamber and having openings permitting fluid to flow into and out of said chamber, a valve core provided with an enlarged intermediate portion and having oppositely extending stem portions, said enlarged portion having a circularly curved exterior surface and having a passage permitting the flow of fluid therethrough, a plurality of arcuate valve plates interposed between the core and the valve body and respectively adapted to close said openings in the body, said valve plates having flanges overlapping the ends of said enlarged portion of the core, said valve plates being rotatable with respect to the core and with respect to said body and said core being rotatable with respect to said valve plates and said body, means for rotating said core, means for limiting the valve opening rotation of said valve plates, means for limiting the valve closing rotation of said valve plates, sliding detents carried by said valve plates adapted to releasably lock said plates alternately to the valve body and to the core, means carried by said core for causing said plates to rotate with respect to said body to thereby shift said detents from locking engagement with said body to locking engagement with said core, a plurality of eccentrics mounted on said stem portions of the valve core, and means pivotally connected to said valve plates and respectively cooperating with said eccentrics for actuating said plates to force them into sealing contact with the valve body and to release them from such sealing contact.

23. A valve involving a valve body formed with a circularly curved chamber and having openings permitting fluid to flow into and out of said chamber, a circularly curved valve core extending into said chamber and having a passage permitting the flow of fluid therethrough, a plurality of arcuate valve plates interposed between said core and the valve body and adapted to close said openings in the body, said plates being recessed at their edges and together constituting a rotatable sleeve provided with openings adapted to be brought into alinement with said passage in the valve core and said openings in the valve body, means for causing said plates to rotate with respect to the valve body, means for arresting rotation of said plates during a portion of the rotation of said core, and means for forcing said plates into sealing contact with said body during rotation of said core with respect to said plates, said last-named means also serving to retract said plates from sealing contact with said body.

24. A valve involving a valve body formed with a chamber and having openings for the flow of fluid into and out of said chamber, a valve core extending into said chamber and formed to permit fluid to flow through said chamber when the valve is open, a valve plate interposed immediately between said core and valve body and adapted to prevent the flow of fluid through said body, said core, valve plate and body being formed with surfaces of revolution permitting said plate to rotate with respect to the body and to rotate with respect to the core, said plate having concentric curved surfaces respectively cooperating with said body and said core, means for rotating said core, means for causing the valve plate to rotate with the core during a portion of the valve closing rotation of the latter to thereby shift said plate into overlapping relation with one of said openings in the valve body, means for arresting the closing rotation of the valve plate during the valve closing rotation of said core, means for forcing said valve plate into sealing contact with the valve body during a portion of the valve closing rotation of the core while the rotation of said valve plate is arrested, means for arresting rotation of the valve plate with respect to the body during the initial portion of the valve opening rotation of said core, means operating during the initial valve opening rotation of said core for withdrawing said valve plate from sealing contact with the valve body, and means for causing the plate to turn with the core during a portion of the valve closing rotation of the latter to thereby shift the plate out of overlapping relation to said opening in the valve body it is adapted to cover.

25. A valve involving a valve body formed with a chamber and having openings permitting the flow of fluid through said chamber, means extending into said chamber and rotatable with respect to said body for controlling the flow of fluid through said openings, said means including a plurality of valve plates and a valve core interposed between said plates, said valve core having a passage permitting the flow of fluid therethrough and the said valve plates being mounted on said core, said valve plates being respectively adapted to close said openings of the valve body, said core member being journalled to the valve body, means for forcing said valve plates into sealing contact with said valve body and for positively releasing said valve plates from sealing contact with said body, and means for locking said valve plates in fixed relation to the valve body throughout the said releasing operation of said last-named means.

26. A valve involving a valve body formed with a chamber and having openings permitting the flow of fluid therethrough, means extending into said chamber and rotatable with respect to the body for controlling the flow of fluid through said openings, said means including a valve core rotatable with respect to said body and journalled to said body, a plurality of valve plates immediately interposed between said core and body, means for forcing said valve plates into sealing contact with said body and for positively releasing said valve plates from sealing contact with said body, and means for locking said valve plates in fixed relation to the valve body throughout the said releasing operation of said last-named means.

27. A valve involving a valve body formed with a chamber and having openings permitting the flow of fluid therethrough, said openings being bordered by curved surfaces constituting valve seats, means extending into said chamber and rotatable with respect to said body for controlling the flow of fluid through said openings, said means including a plurality of valve plates and a valve core interposed between said plates, said valve core being journalled to the valve body and having a passage permitting the flow of fluid therethrough and the said valve plates being mounted on said core so as to be capable of moving radially toward and from said valve seats, said valve plates being immediately interposed between said body and core and being respectively adapted to close said openings of the valve body and having curved surfaces corresponding to the curved surfaces of said valve seats, portions of said valve core adjacent said valve plates being curved concentric with said curved valve seats, means for rotating said core, and means for forcing said valve plates into sealing contact with said valve body and for positively releasing said valve plates from sealing contact with said body.

28. A valve involving a valve body having an inlet opening and an outlet opening and provided with a chamber communicating with said openings, and means extending into said chamber and rotatable with respect to said body for controlling the flow of fluid through said openings, said means including a plurality of valve plates respectively adapted to close said openings, a stem member rotatable with respect to said body and valve plates, means actuated by the rotation of said stem member for shifting said plates radially with respect to the axis of rotation of said stem member, and a latch controlled by the movement of said stem member, said latch being movable with respect to said plates and constituting means for causing the plates to rotate with said stem member during the initial valve closing rotation of the latter and for preventing rotation of said valve plates with respect to the valve body during the initial valve opening rotation of the said stem member.

29. A valve involving a valve body having an inlet opening and an outlet opening and provided with a chamber communicating with said openings, and means extending into said chamber and rotatable with respect to said body for controlling the flow of fluid through said openings, said means including a plurality of valve plates respectively adapted to seal said openings, a stem member rotatable with respect to said body and valve plates, means operatively interposed between said stem member and the valve plates for shifting the latter radially with respect to the stem member, and a latch rotatable with said plates and movable with respect to the stem member and said body, said stem member and said body each being provided with stop means for alternately cooperating with said latch, and said latch and said stop means serving to prevent rotation of said valve plates with respect to the body throughout the said radial shifting of the valve plates.

In testimony whereof I affix my signature.
ALFRED G. HEGGEM.